D. H. TALBERT.
CORN POPPING MACHINE.
APPLICATION FILED AUG. 9, 1915.
1,233,421.
Patented July 17, 1917.
2 SHEETS—SHEET 2.
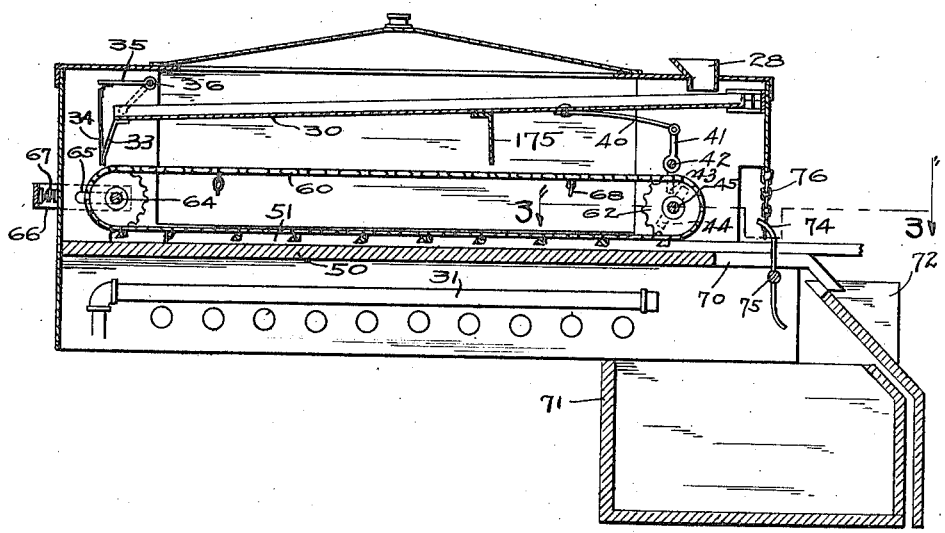
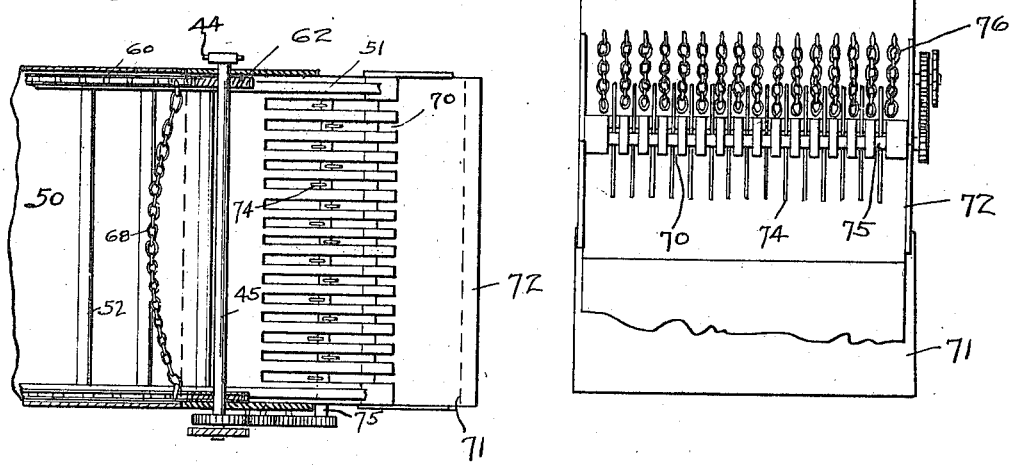
WITNESSES:
INVENTOR
Daniel H. Talbert.
BY
ATTORNEY

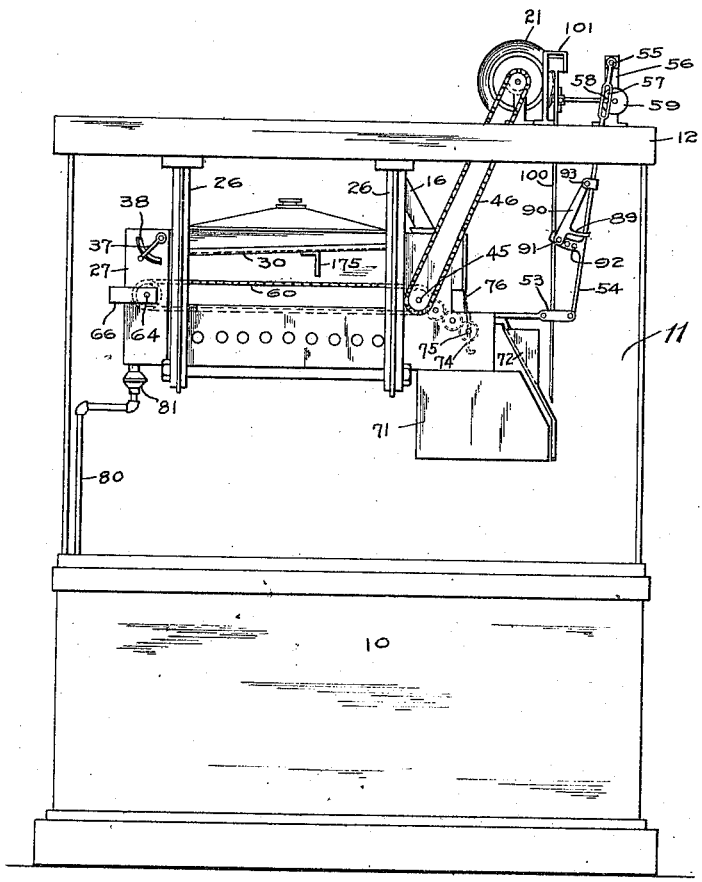

UNITED STATES PATENT OFFICE.

DANIEL H. TALBERT, OF INDIANAPOLIS, INDIANA, ASSIGNOR TO HOLCOMB & HOKE MANUFACTURING COMPANY, OF INDIANAPOLIS, INDIANA.

CORN-POPPING MACHINE.

1,233,421.

Specification of Letters Patent.

Patented July 17, 1917.

Original application filed January 9, 1915, Serial No. 1,355. Divided and this application filed August 9, 1915. Serial No. 44,574.

*To all whom it may concern:*

Be it known that I, DANIEL H. TALBERT, a citizen of the United States, and a resident of Indianapolis, county of Marion, and State of Indiana, have invented a certain new and useful Corn-Popping Machine; and I do hereby declare that the following is a full, clear, and exact description thereof, reference being had to the accompanying drawings, in which like letters refer to like parts.

This application is a division from a prior application filed Jan. 9th, 1915, which resulted in Letters Patent #1,165,556 granted Dec. 28th, 1915.

The object of this invention is to improve and simplify the construction and operation of continuously operating corn popping machines and enable them to reduce the waste of unpopped corn.

One feature of the invention consists in the means for separating the unpopped corn from the popped corn at the discharge end of the popping plate and consists in there being longitudinal slots at that end of the popping plate through which the unpopped corn can fall, but the popped corn cannot pass and fingers revolving in said slots moving upward through the inner ends of the slots, lifting the material above so as to effectively separate the unpopped corn and enable it to pass down through the slots. Said revolving fingers also move and feed the corn from the popping plate and discharge it over the end thereof.

Another feature of the invention consists in providing a chain curtain above the discharge end of the popping plate and which permits said fingers to move the popped corn through the lower portion of the curtain and discharge same from the popping plate.

The full nature of the invention will be understood from the accompanying drawings and the following description and claims:

In the drawings Figure 1 is an elevation of the machine. Fig. 2 is a central vertical section through the popper. Fig. 3 is a section on the line 3—3 of Fig. 2. Fig. 4 is a front elevation of the machine.

A stand 10 has upon it a glass case 11 having a wooden top 12. A hopper, not shown, is mounted on the top 12 of the casing and has a discharge chute 16 extending down to the popping means below the top 12 of the casing 11.

There are supports 26 which extend down from the top 12 of the casing whereby a popping casing 27 is supported. This casing has a closed top with a corn inlet 28 into which the lower end of the chute 16 projects and through which it discharges the corn.

The corn first falls on the preheating plate 30 which is inclined so that the corn may travel by gravity very slowly from the end thereof upon which it is deposited to the other end. This plate is above the heater 31 so that it is kept hot and it is shaken in order to keep the corn moving and prevent it from becoming too hot at one point. The high end of the preheating plate is supported by a pair of springs, not shown. The lower end of the plate 30 is pivotally supported on the upper end of a spring bar 33 which is secured at its lower end to a companion spring bar 34, which is pivoted at its upper end to an arm 35 pivoted at 36 in the casing 27 and an adjusting bar 37 extends outside the case and is held in adjusted position by a segmental rack bar 38, whereby said plate 30 is reciprocally supported so that its lower end may be vertically adjusted to change its inclination and the movement of the corn. Said plate is given a quick rearward movement by a connecting spring bar 40, one end of which is secured to said plate and the other end pivoted to a crank 41 extending up from a shaft 42, as shown in Fig. 4. There is an arm 43 extending from the outer end of said shaft 42 in position to be engaged by a diametrical rod or arm 44 on a shaft 45 which is driven by a belt 46 from a motor 21, as shown in Fig. 1, at each half revolution of the shaft 45. Therefore, the preheating plate 30 is given a sudden rearward movement and then it is quickly returned by the springs 32 to its normal position and said movement is constantly repeated so as to shake the plate in a jerky manner and cause the slow travel of the corn on its plate.

The timing of the movement of the corn over the preheating plate is effected by elevating and lowering the forward end of the plate which may be accomplished by turning the bar 36 to which is rigidly connected the bar 35. The corn does not pop on the plate 30 but merely becomes preheated and to a rather high degree of temperature so that it is about ready to pop. It falls over the lower end and advancing edge of the preheating plate and descends upon a popping plate 50 which, in this machine, is stationary. The movement of the popcorn over the popping plate is effected by two coöperating means. In the first place there is an agitating frame reciprocated upon the popping plate and consisting of side bars 51 and cross bars 52. This frame is reciprocated by a connecting rod 53, see Fig. 1, pivotally connected with a lever 54 which is fulcrumed at its upper end at 55 to a frame 56 upon the top 12 of the machine. Near its upper end said lever 54 has a longitudinal slot 57 through which a wrist pin 58 in an eccentric wheel 59 loosely projects. Said wheel 59 is driven by means not shown, from the motor 21.

Coöperating with the frame there is an endless drag conveyer formed of lateral sprocket chains 60 and transverse sagging chains 68. The conveyer operates on pulleys 62 secured on a shaft 64 at the other end. Said shaft 64 is mounted in the slots 65 in the end of a frame 66, which extends rearwardly of the main frame and springs 67 are mounted between the frame 27 and the cross bar of said frame 66 so that the springs tend to force the frame 66 away from the frame 27 and this holds the belt taut.

This drag conveyer is so mounted that the sagging chains 68 drag the popped corn over the popping plate 50 to the discharge end. As this operation is in progress, the "shot" is gradually moved by the movement of the popped corn over the cross bars 52 of the agitating frame and said cross bars tend to resist this action. The drag chains do not touch the popping plate 50, but drags the popped corn and, indirectly, the "shot" over the cross bars 52 of the agitating frame. At the left hand end of said agitating frame said cross bars are beveled, so that the "shot" can be more readily moved over the first few bars, but the bevel diminishes from bar to bar in the progress of the "shot" so that they increasingly tend to resist the feeding movement of the "shot", over the popping plate. This is to keep the "shot" agitated and moving in the same direction as the popped corn, but to bring it repeatedly down upon the popping plate for the purpose of effectually popping it before it leaves the popping plate. The side bars 51 of the agitating frame are beveled to prevent the accumulation of "shot" thereon.

The agitating frame and the drag conveyer coöperate together so well on the stationary popping plate that it is impossible for any popcorn capable of popping to avoid being popped for ample opportunity is given the same to be preheated and afterward popped.

When the popped corn and "shot", if there be any "shot", reaches the discharge end of the popping plate 50, the "shot" drops down through the slots 70, see Fig. 3, into a "shot" receptacle 71. The popped corn is too large to enter said slots, and, therefore, they pass on over the down turned end of the plate 50, as seen in Fig. 1, and are discharged upon an inclined plate 72 which leads to the buttering means. To facilitate the separation of the "shot" from the popped corn, a series of arms 74 with backwardly turned ends is centrally mounted on a shaft 75, so the arms rotate through the slots 70, going through the inner ends of said slots upwardly and thus lifting the "shot" and popped corn so that the "shot" will separate and fall through the slots and the popped corn will be carried on to the discharge end of the plate 50.

To prevent the popped corn and the "shot" kicked up by the popped corn during the explosions from escaping, a baffle plate 175 is secured to the underside of the preheating plate 30. There is a chain curtain 76 suspended over the series of slots 70 and in position to be engaged by the rotating arms 74. Said arms passing in their rotation through the curtain prevents the corn from popping over the discharge end of the popping plate. Gas is supplied to the heater 31 through a pipe 80 and mixer 81.

The invention claimed is:

1. In a popcorn machine, a substantially horizontal plate adapted to receive the popped and unpopped corn, the end of said plate being provided with longitudinal slots, and agitating means adapted to be moved upward through the forward portion of said slots for agitating the popped and unpopped corn and enabling the unpopped corn to pass down through said slots and to move rearwardly through said slots at the end of said plate for discharging the popped corn therefrom.

2. In a popcorn machine, a popping plate with the rear end thereof longitudinally slotted, means movable longitudinally on said plate for conveying popped and unpopped corn to the slotted end thereof, and agitating means adapted to be moved upward through the forward portion of said slots for agitating the popped and unpopped corn and enabling the unpopped corn to pass down through said slots and to move rearwardly through said slots at the end of said plate for discharging the popped corn therefrom.

3. In a popcorn machine, a slotted plate adapted to receive the popped and unpopped corn, a shaft mounted immediately below said slotted plate, fingers on said shaft adapted to rotate through said slots, means for rotating said shaft so that said fingers will pass upwardly through the portion of the slotted plate which first receives the popped and unpopped corn for separating the unpopped corn and feeding the popped corn forward over said plate, and a flexible curtain suspended over said slotted plate in position to be engaged by said fingers during their upward movement.

4. In a popcorn machine, a slotted plate adapted to receive the popped and unpopped corn, a shaft mounted immediately below said slotted plate, fingers on said shaft adapted to rotate through said slots, means for rotating said shaft so that said fingers will pass upwardly through the portion of the slotted plate which first receives the popped and unpopped corn for separating the unpopped corn and feeding the popped corn forward over said plate, and a chain curtain suspended over said plate in position for the fingers during their upward movement to pass between the chains at the lower part of the curtain.

In witness whereof, I have hereunto affixed my signature in the presence of the witness herein named.

DANIEL H. TALBERT.

Witness:
R. G. LOCKWOOD.

Copies of this patent may be obtained for five cents each, by addressing the "Commissioner of Patents, Washington, D. C."